US012722975B2

(12) United States Patent
Olsson et al.

(10) Patent No.: US 12,722,975 B2
(45) Date of Patent: Sep. 1, 2026

(54) PROCESS FOR PRODUCING CARBON FROM HEAT TREATED LIGNIN

(71) Applicant: Stora Enso OYJ, Helsinki (FI)

(72) Inventors: Vilhelm Olsson, Täby (SE); Dimitri Areskogh, Bromma (SE); Stephan Walter, Tyresö (SE)

(73) Assignee: Stora Enso OYJ, Helsinki (FI)

( * ) Notice: Subject to any disclaimer, the term of this patent is extended or adjusted under 35 U.S.C. 154(b) by 631 days.

(21) Appl. No.: 18/000,870

(22) PCT Filed: Jun. 10, 2021

(86) PCT No.: PCT/IB2021/055103
§ 371 (c)(1),
(2) Date: Dec. 6, 2022

(87) PCT Pub. No.: WO2021/250604
PCT Pub. Date: Dec. 16, 2021

(65) Prior Publication Data

US 2023/0212010 A1 Jul. 6, 2023

(30) Foreign Application Priority Data

Jun. 11, 2020 (SE) .................................... 2050699-4

(51) Int. Cl.
*C01B 32/05* (2017.01)
*C08H 7/00* (2011.01)

(52) U.S. Cl.
CPC ............... *C01B 32/05* (2017.08); *C08H 6/00* (2013.01); *C01P 2006/11* (2013.01); *C01P 2006/62* (2013.01)

(58) Field of Classification Search
CPC .. C01B 32/05; C01P 2006/11; C01P 2006/62; C08H 6/00
See application file for complete search history.

(56) References Cited

U.S. PATENT DOCUMENTS 6,099,990 A 8/2000 Denton, III et al.
2015/0232339 A1* 8/2015 Wei ....................... C01B 32/154 264/29.2
2016/0141618 A1* 5/2016 Lim ...................... H01M 4/485 252/506
2016/0230099 A1 8/2016 Hilli et al.
2017/0183231 A1* 6/2017 Morris .................... C01B 32/05
2017/0313585 A1 11/2017 Walter et al.
2022/0127296 A1 4/2022 Areskogh

FOREIGN PATENT DOCUMENTS

| | | | |
|---|---|---|---|
| CN | 106966390 | A | 7/2017 |
| CN | 113811579 | A | 12/2021 |
| EP | 3053929 | A1 | 8/2016 |
| JP | H06183715 | A | 7/1994 |
| JP | 2011178851 | A | 9/2011 |
| JP | 2015067514 | A | 4/2015 |
| WO | 2006031175 | A1 | 3/2006 |
| WO | 2020183383 | A1 | 9/2020 |

OTHER PUBLICATIONS

International Search Report from corresponding PCT application No. PCT/IB2021/055103, mailed on Sep. 3, 2021.
Brodin, Ida et al., Oxidative stabilisation of kraft lignin for carbon fibre production, Holzforschung, vol. 66, pp. 141-147, 2012.
P.O. Ibeh et al., Activated carbon monoliths from lignocellulosic biomass waste for electrochemical applications, Journal of the Taiwan Institute of Chemical Engineers, 97, (2019), 480-488.
Köhnke, Janea et al., Comparison of Four Technical Lignins as a Resource for Electrically Conductive Carbon Particles, BioResources, 14(1), 1091-1109, 2019.
Ragan, Steve et al., Activated Carbon From Renewable Resources—Lignin, Cellulose Chemistry and Technology, 45 (7-8), 527-531 (2011).
Extended European Search Report from corresponding European application No. 21822893.0, dated Sep. 2, 2024.

* cited by examiner

*Primary Examiner* — Stuart L Hendrickson
(74) *Attorney, Agent, or Firm* — Greer, Burns & Crain, Ltd.

(57) ABSTRACT

The present invention is directed to production of granular carbon, prepared from lignin. The process comprises the steps of providing agglomerated lignin, heating the agglomerated lignin to obtain thermally stabilized lignin and subjecting the thermally stabilized agglomerated lignin to heat treatment to obtain granular carbon.

15 Claims, No Drawings

PROCESS FOR PRODUCING CARBON FROM HEAT TREATED LIGNIN

This application is a U.S. National Phase under 35 U.S.C. § 371 of International Application No. PCT/IB2021/055103 filed Jun. 10, 2021, which claims priority under 35 U.S.C. §§ 119 and 365 to Swedish Application No. 2050699-4 filed Jun. 11, 2020.

FIELD OF THE INVENTION

The present invention is directed to production of granular carbon, prepared from lignin.

BACKGROUND

Carbon enriched materials can be used for various end-uses, such as bio-chars, activated carbons and electrode materials.

In conventional processes of converting biomass into carbon-enriched intermediates, powders are often avoided. Direct use of lignin, as a fine powder, is not suitable since it exhibits undesired thermoplastic behaviour.

During thermal conversion of lignin powder into carbon-enriched intermediates, lignin undergoes plastic deformation/melting, aggressive swelling and foaming. Combined with the strong tendency for dust formation during handling, this severely limits processability of lignin in industrially relevant scale, in terms of equipment dimensioning and process throughput as well as need of intermediate processing.

It would be desirable to use lignin as an alternative to fossil-based carbon-containing materials. Lignin, an aromatic polymer is a major constituent in e.g. wood, being the most abundant carbon source on Earth second only to cellulose. In recent years, with development and commercialization of technologies to extract lignin in a highly purified, solid and particularized form from the pulp-making process, it has attracted significant attention as a possible renewable substitute to primarily aromatic chemical precursors currently sourced from the petrochemical industry.

However, to use lignin as a raw material for economical production of carbon enriched materials, such as bio-chars, activated carbons and electrode materials, it would be necessary to avoid that the lignin undergoes plastic deformation/melting, aggressive swelling and foaming upon heating.

U.S. Pat. No. 6,099,990 describes a method of fabricating a carbon material, which involves the steps of mixing a lignin powder with a salt and then heating the mixture in several steps, involving a carbonization step. According to U.S. Pat. No. 6,099,990, foaming is reduced during heating. However, the salts used are expensive and not compatible with a large-scale process. In addition, the salts will remain in the carbon material unless removed by a washing step.

Methods of reducing melting of lignin during heating involve modifying lignin powder with maleic acid as described in JP2015067514, and hydrothermal carbonization treatments of lignin solutions prior to carbonization as described in US2016230099 and JP2011178851.

However, there remains a need for a simple and scalable method of obtaining lignin that can be heat treated with retained shape and dimension to obtain granular carbon.

SUMMARY OF THE INVENTION

It has surprisingly been found that lignin which has undergone agglomeration into macroscopic particles and been thermally stabilized can be heat treated with retained shape and dimension, avoiding melting/swelling deformation. Thereby, production of carbon enriched materials for various end-uses, such as bio-chars and activated carbons, is facilitated and the process avoids dusting. It has been found that a previously agglomerated lignin which has been thermally stabilized will continue to retain its dimensional integrity during further processing into carbon-enriched products. In addition, the obtained granular carbon is essentially spherical and therefore suitable for example for use in filters and other applications in which essentially spherical granular carbon is advantageous.

The present invention is directed to a process to produce granular carbon, said process comprising the steps of a) providing agglomerated lignin having a particle size distribution such that at least 80 wt-% of the agglomerates have a diameter within the range of from 0.2 mm to 5.0 mm;

b) heating the agglomerated lignin to a temperature in the range of from 140 to 250° C. for a period of at least 1.5 hours, to obtain thermally stabilized agglomerated lignin;

c) subjecting the thermally stabilized agglomerated lignin to heat treatment at one or more temperatures in the range of from 300° C. to 1500° C., wherein the heat treatment is carried out for a total time of from 30 minutes to 10 hours, to obtain granular carbon.

Preferably the particle size distribution of the agglomerated lignin obtained in step b) is such that at least 80 wt-% of the agglomerates have a diameter within the range of from 0.2 mm to 5.0 mm.

Preferably, the agglomerated lignin used in step a) is produced by i. providing lignin in the form of a powder, wherein the particle size distribution of the lignin in the form of a powder is such that at least 80 wt-% of the particles have a diameter less than 0.2 mm and a moisture content of less than 45 wt-%;

ii. compacting the lignin powder of step i);

iii. crushing the compacted lignin obtained in step ii);

iv. optionally sieving the compacted lignin obtained in step iii) to remove particles having a particle diameter below 100 μm, thereby obtaining the agglomerated lignin having a particle size distribution such that at least 80 wt-% of the particles have a diameter within the range of from 0.2 mm to 5.0 mm.

Preferably, the product obtained in step iii is subjected to sieving in accordance with step iv. Preferably, in step iv, the sieving is carried out such that the agglomerated lignin obtained has a particle size distribution such that at least 80 wt-% of the particles have a diameter in the range of from 0.5 mm to 2.0 mm, more preferably 0.5 mm to 1.5 mm.

The compaction may be carried out without addition of any additives to the material to be compacted. In the context of the present invention, an additive is a substance that is added to the process to improve adhesion between the lignin particles. Thus, additives are substances that are added, but that are not present in the lignin that is the starting material in step a). Thus, neither moisture, such as water, nor other components already present in the lignin that is the starting material in step i), are considered additives in the context of the present invention.

DETAILED DESCRIPTION

It is intended throughout the present description that the expression "lignin" embraces any kind of lignin, e.g. lignin originated from hardwood, softwood or annular plants. Preferably the lignin is an alkaline lignin generated in e.g. the Kraft process. Preferably, the lignin has been purified or isolated before being used in the process according to the present invention. The lignin may be isolated from black liquor and optionally be further purified before being used in the process according to the present invention. The purification is typically such that the purity of the lignin is at least 90%, preferably at least 95%, more preferably at least 98%, most preferably at least 99%, 99.5% or 99.9%. Thus, the lignin used according to the process of the present invention preferably contains less than 10%, preferably less than 5%, more preferably less than 2% impurities. The lignin may be separated from the black liquor by using the process disclosed in WO2006031175.

In the context of the present invention, the diameter of a particle is the equivalent spherical diameter of the particle, if the particle is not spherical. The equivalent spherical diameter is the diameter of a sphere of equivalent volume.

Preferably, the agglomerated lignin is prepared by a process comprising the steps of i. providing lignin in the form of a powder, wherein the particle size distribution of the lignin in the form of a powder is such that at least 80 wt-% of the particles have a diameter less than 0.2 mm and a moisture content of less than 45 wt-%;

ii. compacting the lignin powder of step i);

iii. crushing the compacted lignin obtained in step ii);

optionally sieving the compacted lignin obtained in step iii) to remove particles having a particle diameter below 100 μm, thereby obtaining the agglomerated lignin having a particle size distribution such that at least 80 wt-% of the particles have a diameter in the range of 0.2 mm to 5.0 mm, preferably from 0.2 mm to 2.0 mm, more preferably from 0.5 to 1.5 mm.

Preferably, the lignin in powder form is dried before compaction. The drying of the lignin is carried out by methods and equipment known in the art. The lignin in powder form used in step i) has a moisture content of less than 45 wt-%. Preferably, the moisture content of the lignin before compaction according to the present invention is less than 25 wt-%, preferably less than 10 wt-%, more preferably less than 8 wt-%. In one embodiment, the moisture content of the lignin before compaction according to the present invention is at least 1 wt-%, such as at least 5 wt-%. The temperature during the drying is preferably in the range of from 80° C. to 160° C., more preferably in the range of from 100° C. to 120° C.

The lignin powder obtained after drying has a wide particle size distribution ranging from 1 μm to 2 mm which is significantly skewed towards the micrometer range, meaning that a significant proportion of the particles has a diameter in the range of 1 to 200 micrometers.

The compaction of the lignin is preferably carried out by roll compaction.

The roll compaction of lignin can be achieved by a roller compactor to agglomerate the lignin particles.

In the compaction step, an intermediate product is generated. Here, the fine lignin powder is usually fed through a hopper and conveyed by means of a horizontal or vertical feeding screw into the compaction zone where the material is compacted into flakes by compaction rollers with a defined gap. By controlling the feeding screw speed, the pressure development in the compaction zone, flakes with uniform density can be obtained. The pressure development in the compaction zone can preferably be monitored and controlled by the rotational speed of the compaction rolls. As the powder is dragged between the rollers, it enters what is termed as the nip area where the density of the material is increased and the powder is converted into a flake or ribbon. The rolls used have cavities. The depth of each cavity used in the roll compaction is from 0.1 mm to 10 mm, preferably from 1 mm to 8 mm, more preferably from 1 mm to 5 mm or from 1 mm to 3 mm. The specific press force exerted during the compaction may vary depending on the equipment used for compaction, but may be in the range of from 1 kN/cm to 100 KN/cm. Equipment suitable for carrying out the compaction are known in the art.

After compaction, crushing is preferably carried out.

In the crushing step, the intermediate product from the compaction step is subjected to crushing or grinding, such as by means of rotary granulator, cage mill, beater mill, hammer mill or crusher mill and/or combinations thereof. During this step, a further intermediate product is generated.

After crushing, the crushed material is preferably subjected to a sieving step, to remove fine material. In addition, large material, such as agglomerates having a diameter larger than 5.0 mm, may be removed and/or recirculated back to the crushing step.

In the sieving step, the intermediate product from the crushing step is screened by means of physical fractionation such as sieving, also referred to as screening, to obtain a product which is agglomerated lignin with a defined particle size distribution set by the porosity of the sieves or screens in this step. The sieve or screen is selected such that most particles having a diameter below 100 (or 500) μm pass through the screen and are rejected and preferably returned to the compaction step, whereas most particles having a diameter above 100 (or 500) μm are retained and subjected to the subsequent heating step of the process according to the present invention. The sieving may be carried out in more than one step, i.e. the sieving can be carried out such that the crushed material from the crushing step passes sequentially through more than one screen or sieve.

In one embodiment of the roll compaction, the rolls configuration is such that the first roll has an annual rim in such configuration so that the powder in the nip region is sealed in the axial direction along the roller surface.

In one embodiment, the roll configuration is such that the nip region is sealed in the axial direction along the roller surface with a static plate.

By ensuring that the nip region is sealed, loss of powder at the axial ends of the rollers is minimized as compared to entirely cylindrical nip rollers.

It is particularly beneficial to carry out the compaction according to the present invention on a material that is essentially only lignin, i.e. in the absence of additives, since that makes the use of the compacted product easier, due to the absence of binders or other components that could otherwise negatively influence the application in which the compacted, crushed and optionally sieved lignin is supposed to be used.

Due to the compaction of the lignin powder during preparation of agglomerated lignin, the bulk density of lignin will increase as pressure is applied to the lignin powder. This means that the agglomerated lignin will have a higher bulk density than the lignin powder. More compact lignin particles may be beneficial during subsequent processing to carbon enriched materials, as compact lignin particles have been found to retain its shape and dimensions with no melting or swelling. The agglomerated lignin particles will also have a relatively higher hardness after compaction. Hard particles are advantageous during subsequent processing as they can resist physical impact during processing. Further, when using hard, compacted particles processing problems that might arise due to the presence of lignin dust on the surface of the particles are avoided. This is of particular importance in a large-scale process since dust can form explosive mixtures with air and also cause blockings inside processing equipment.

The agglomerated lignin preferably has a bulk density in the range of from 0.5 $g/cm^3$ to 0.7 $g/cm^3$, more preferably from 0.5 $g/cm^3$ to 0.6 $g/cm^3$. The lignin powder, prior to agglomeration, preferably has a bulk density in the range of from 0.3 $g/cm^3$ to 0.4 $g/cm^3$. The thermally stabilized agglomerated lignin preferably also has a bulk density in the range of from 0.5 $g/cm^3$ to 0.7 $g/cm^3$, more preferably from 0.5 $g/cm^3$ to 0.6 $g/cm^3$. The thermal stabilization might lead to a slight increase or decrease in bulk density of the lignin. The bulk density will however preferably remain within the same range as prior to the thermal stabilization.

The agglomerated lignin has a particle size distribution such that at least 80 wt-% of the particles have a diameter in the range of from 0.2 mm to 5.0 mm. Preferably, the particle size distribution is such that at least 90 wt-%, more preferably at least 95 wt-%, of the particles have a diameter in the range of from 0.2 mm to 5.0 mm. More preferably, at least 90 wt-%, more preferably at least 95 wt-%, of the particles have a diameter in the range of from 0.5 mm to 2 mm.

The step of heating the agglomerated lignin to produce thermally stabilized agglomerated lignin can be carried out continuously or in batch mode. The heating can be carried out using methods known in the art and can be carried out in the presence of air or completely or partially under inert gas. Preferably, the heating is carried out in a rotary kiln, moving bed furnace or rotary hearth furnace.

The heating to produce thermally stabilized agglomerated lignin is carried out at such that the agglomerated lignin is heated to a temperature in the range of from 140 to 250° C., preferably from 180 to 230° C. The heating is carried out for at least 1.5 hours, i.e. the residence time of the agglomerated lignin inside the equipment used for the heating is at least 1.5 hours. Preferably, the heating is carried for less than 12 hours. The heating may be carried out at the same temperature throughout the entire heating stage or may be carried out at varying temperature, such as a stepwise increase of the temperature or using a temperature gradient. More preferably, the heating is carried out such that the agglomerated lignin is first heated to a temperature of from 140 to 175° C. for a period of at least one hour and subsequently heated to a temperature of from 175 to 250° C. for at least one hour.

By controlling and optimizing parameters such as temperature and time during the thermal stabilization process, thermally stabilized agglomerated lignin that retains its shape and dimensions with no fusing or swelling during subsequent processing can be obtained. The described process has an excellent compatibility with the typical process requirements for continuous production, using rotary kiln for example, due to mechanical stability of the agglomerated lignin and a relatively short residence time. This is of particular importance for achieving an economical large industry-scale process for producing carbon enriched materials.

The colour of the thermally stabilized agglomerated lignin is different from the colour of the agglomerated lignin prior to thermal stabilization. The colour can be determined for example by using a spectrophotometer and reported in accordance with the CIELAB colour space. In the CIELAB colour space, colour can be reported as lightness (L*), green-red (a*) and blue-yellow (b*) components. Preferably, the lightness (L*) of the surface of the thermally stabilized agglomerated lignin is in the range of from 37 to 39, preferably in the range of from 37 to 38. The lightness of the surface of the agglomerated lignin prior to thermal stabilization is above 44, such as in the range of from 44 to 52. Thus, the lightness of the agglomerated lignin decreases during thermal stabilization.

The thermally stabilized agglomerated lignin obtained in step b) is subjected to heat treatment at one or more temperatures in the range of from 300° C. to 1500° C., wherein the heat treatment is carried out for a total time of from 30 minutes to 10 hours, to obtain granular carbon.

Preferably, the heat treatment comprises a preliminary heating step, preferably followed by a final heating step. The preliminary heating step is preferably carried out at a temperature of between 30° and 800° C., such as between 500 and 700° C. under inert atmosphere, preferably nitrogen atmosphere. The duration of the preliminary heating step is at least 30 minutes and preferably less than 10 hours. The preliminary and final heating steps may be carried out as discrete steps or as one single step in direct sequence. The surface area of the product obtained after the preliminary heating step is typically in the range of from 300 to 700 $m^2/g$, measured as BET using nitrogen gas.

The final heating step is preferably carried out at a temperature between 800° C. and 1500° C., under inert atmosphere, preferably nitrogen atmosphere. The duration of final heating step is at least 30 minutes and preferably less than 10 hours. After the final heating step, the surface area of the product obtained is typically 10 $m^2/g$ or less.

Preferably, the heat treatment is carried out stepwise. Preferably, the preliminary heating starts at about 300° C. and is subsequently increased to about 500° C. The final heating step is preferably carried out between 900° C. and 1300° C., such as at about 1000° C.

The heat treated material, i.e. the granular carbon which is the product of step c), is useful for example as bio-char, or as precursor to activated carbon or electrode material The heat treated material, i.e. the granular carbon which is the product of step c) preferably has a bulk density in the range of from 0.2 $g/cm^3$ to 0.4 $g/cm^3$. This is lower than the bulk density of the agglomerated lignin and the thermally stabilized lignin obtained in step b), primarily due to mass loss during the heat treatments.

The colour of the granular carbon is different from the colour of the thermally stabilized agglomerated lignin prior. The colour can be determined for example by using a spectrophotometer and reported in accordance with the CIELAB colour space. In the CIELAB colour space, colour can be reported as lightness (L*), green-red (a*) and blue-yellow (b*) components. Preferably, the lightness (L*) of the surface of the granular carbon is in the range of from 34 to 37, preferably in the range of from 34 to 36. Thus, the lightness of the agglomerated lignin decreases during step c).

EXAMPLES

Example 1

Lignin powder from the LignoBoost process was agglomerated by means of roller compaction into particles with a size distribution of 0.2-2 mm. The agglomerated lignin was heated slowly up to 200° C. and held for 12 h. During this process, the agglomerated lignin did not exhibit any melting behaviour and completely retained its original shape. Surprisingly it was found that the individual granules did not fuse together and remained free flowing. The material gradually darkened during the processing until it was completely black and free of smell.

The thermally stabilized agglomerated lignin was subsequently heated at 500-1000° C. under inert atmosphere. In this process, the formed carbon granules were rounded in shape and remained free-flowing.

Example 2

Lignin powder from the LignoBoost process was agglomerated by means of roller compaction, then crushed and sieved into particles with a size distribution of 0.5-1.5 mm.

The agglomerated lignin was placed inside a laboratory rotary furnace, heated to 160° C. using air-flow for 2h, followed by heating up to 225° C. for 2 h. During this process, the agglomerated lignin did not exhibit any melting behaviour. Surprisingly it was found that the individual granules did not fuse together or to the reactor walls and remained free flowing. The material gradually darkened during the processing until it was completely black.

The thermally stabilized agglomerated lignin was subsequently heated to 300-350° C. for 1h, and then 500° C. under inert atmosphere using nitrogen for 1h. Finally, this material was heated up to 1000° C. under nitrogen for 1 h. The resulting carbon material remained in non-agglomerated granular form.

Example 3

This experiment was conducted in the same way as Example 2 except that the agglomerated lignin was heated to 200° C.

The resulting carbon material was free-flowing but experienced some degree of melting and fusing. This shows that thermally stabilized lignin obtained by heating at 225° C., as shown in Example 2, could resist melting and fusing during heat processing in a better way. This further highlights the importance of selecting the correct combination of temperature and time for the thermal stabilization step.

Example 4 (Comparative Example)

In this experiment, thermal conversion of conventional lignin powder was carried out.

Lignin powder from the LignoBoost process was heated slowly up to 200° C. and held for 12 h. After the heating, it was found that the lignin had melted/fused into a solid black cake free of smell. This experiment shows the importance of agglomeration of lignin powder prior to the thermal stabilization step.

Example 5

In this experiment, a larger-scale continuous process for manufacturing granular carbon was evaluated. Lignin powder from the LignoBoost process was agglomerated by means of roller compaction, then crushed and sieved into particles with a size distribution of 0.5-1.5 mm. The lignin had a bulk density of 0.60 g/cm$^3$. Thermal stabilization of the agglomerated lignin was performed in air in a rotary kiln, the feed rate was 3 kg/h. The temperature was ramped from 170° C. to 230° C. in different heating zones and the mean residence time in the rotary kiln was 2.5 hours.

The bulk density of the thermally stabilized agglomerated lignin was 0.66 g/cm$^3$, a slight increase compared to the agglomerated lignin prior to stabilization.

The colour of the samples was measured using a Konica Minolta CM-5 spectrophotometer. Samples were not pretreated. The measurement gave the colour in the metrics of the CIELAB colour space. The agglomerated kraft lignin used as a starting value had an L*-value of 49.4. After thermal stabilization, the L*-value was measured at six times during a time period of five days. The values ranged from 37.4 to 37.9.

Matt black agglomerates were obtained. The thermally stabilized lignin agglomerates were free-flowing and exhibited a low degree of melting during the stabilization step. The total feed of agglomerated lignin was 441 kg and the total output was 390 kg, giving an overall yield of 93%. The total time of the trial was 172 h.

Subsequently, a continuous pre-carbonization heat treatment of the thermally stabilized agglomerated lignin was performed in a rotary kiln in a nitrogen atmosphere. The feed rate was 3 kg/h and the and the mean residence time in the rotary kiln was 2.5 hours. The temperature was ramped from 250° C. to 525° C. in different heating zones. The bulk density of the pre-carbonized lignin was 160 g/cm$^3$. The L*-value of the pre-carbonized lignin was measured at four times during a time period of four days. The values ranged from 39.8 to 40.7. Shiny grey agglomerates were obtained. The agglomerates exhibited a low degree of melting and fusing during the pre-carbonization step. The total feed of thermally stabilized agglomerated lignin was 339 kg and the total output was 183 kg, giving an overall yield of 54%. The total time of the trial was 121 h.

Finally, a continuous carbonization step of the pre-carbonized lignin was performed in the rotary kiln in a nitrogen atmosphere. The feed rate was 2 kg/h and the and the mean residence time in the rotary kiln was 1 hour. The temperature was set to 1000° C. The bulk density of the obtained carbonized lignin was 190 g/cm$^3$. The increase compared to the pre-carbonized lignin may be due to shrinkage of the agglomerates. The L*-value of the carbonized lignin was measured at four times during a time period of three days. The values ranged from 35.2 to 35.9. Matt black agglomerates were obtained after the carbonization. No further melting or fusing of the agglomerates was observed during carbonization. The total feed of pre-carbonized lignin was 169 kg and the total output was 134 kg, giving an overall yield of 80%. The total time of the trial was 76 h.

This demonstrates that a large-scale process is possible.

In view of the above detailed description of the present invention, other modifications and variations will become apparent to those skilled in the art. However, it should be apparent that such other modifications and variations may be effected without departing from the spirit and scope of the invention.

The invention claimed is:

1. A process to produce granular carbon from lignin, said process comprising the steps of a) providing a dried agglomerated lignin having a particle size distribution such that at least 80 wt-% of the dried agglomerated lignin has a diameter within a range of from 0.2 mm to 5.0 mm;

b) thermally stabilizing the dried agglomerated lignin by heating the agglomerated lignin to a temperature in a range of from 180 to 250° C. for a period of at least 1.5 hours and less than 12 hours, to obtain thermally stabilized agglomerated lignin, wherein the heating of the agglomerated lignin in step b) is carried out in air; and c) subjecting the thermally stabilized agglomerated lignin to heat treatment at one or more temperatures in the range of from 300° C. and 1500° C., wherein the heat treatment is carried out for a total time of from 30 minutes to 10 hours, to obtain granular carbon.

2. The process according to claim 1, wherein the dried agglomerated lignin used in step a) is produced by i. providing lignin in a form of a powder, wherein a particle size distribution of the lignin in the form of the powder is such that at least 80 wt-% of the lignin has a diameter less than 0.2 mm and a moisture content of less than 45 wt-%;

ii. compacting the lignin of step i); and iii. crushing the compacted lignin obtained in step ii);

thereby obtaining the agglomerated lignin.

3. The process of claim 2, further comprising:

iv. sieving the compacted lignin obtained in step iii) to remove particles having a particle diameter below 100 μm.

4. The process according to claim 1, wherein the dried agglomerated lignin has a bulk density in a range of from 0.5 $g/cm^3$ to 0.7 $g/cm^3$.

5. The process according to claim 1, wherein the heating of the dried agglomerated lignin in step b) is performed by first heating the dried agglomerated lignin to a temperature of from 140 to 175° C. for a period of at least one hour and subsequently heating the dried agglomerated lignin to a temperature of from 180 to 250° C. for at least 1.5 hours.

6. The process according to claim 1, wherein step c) comprises a preliminary heating step, followed by a final heating step.

7. The process according to claim 6, wherein the preliminary heating step c) is carried out at a temperature of between 40° and 800° C. for at least 30 minutes.

8. The process according to claim 7, wherein the preliminary heating step is carried out in an inert atmosphere.

9. The process according to claim 6, wherein the final heating step is carried out at a temperature between 800° C. and 1500° C. for at least 30 minutes.

10. The process according to claim 9, wherein the final heating step is carried out in an inert atmosphere.

11. The process according to claim 1, wherein a CIELAB lightness (L*) of a surface of the thermally stabilized agglomerated lignin obtained in step b) is in a range of from 37 to 39.

12. The process according to claim 1, wherein a CIELAB lightness (L*) of a surface of the granular carbon obtained in step c) is in a range of from 34 to 37.

13. The process according to claim 1, wherein the granular carbon obtained in step c) has a bulk density in a range of 0.2 $g/cm^3$ to 0.4 $g/cm^3$.

14. The process according to claim 1, wherein the lignin is kraft lignin.

15. The process according to claim 14, wherein a purity of the lignin is at least 98%.

* * * * *